Figure 1:
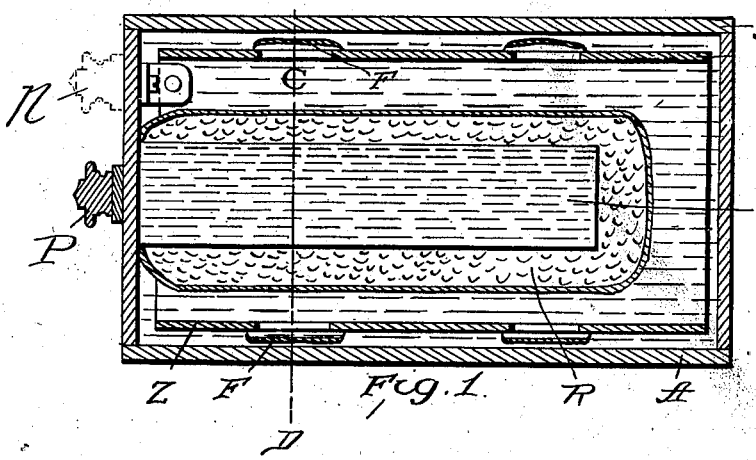

No. 702,544.  
P. DELAFON.  
ELECTRIC BATTERY.  
(Application filed Apr. 3, 1900.)  
Patented June 17, 1902.

(No Model.)

Attest:  
Edw. L. Reed.

Inventor  
Philippe Delafon,  
By Richards & Co.  
attys

THE NORRIS PETERS CO., PHOTO-LITHO., WASHINGTON, D. C.

UNITED STATES PATENT OFFICE.

PHILIPPE DELAFON, OF PARIS, FRANCE.

ELECTRIC BATTERY.

SPECIFICATION forming part of Letters Patent No. 702,544, dated June 17, 1902.

Application filed April 3, 1900. Serial No. 11,351. (No model.)

*To all whom it may concern:*

Be it known that I, PHILIPPE DELAFON, a citizen of the French Republic, residing at Paris, France, have invented certain new and useful Improvements in Electric Batteries, of which the following is a specification.

The present invention relates to a dry electric battery which has the following advantages over all similar batteries of the present day: first, facility of construction; second, light weight; third, considerable zinc surface, the zinc being exposed on all its surfaces and all its area, an advantage which has not been realized by previous dry batteries; fourth, long duration of the battery; fifth, very small cost price; sixth, a large yield in amperes and of great voltage; seventh, absolute absence of leakage and non-working when the circuit is open; eighth, a resistance to very high temperatures, a condition which is of great importance in connection with automobile purposes; ninth, working in any position.

The arrangement of the present battery will be understood by referring to the drawings, the same letters being applied to the same parts in the various figures.

Figure 2:
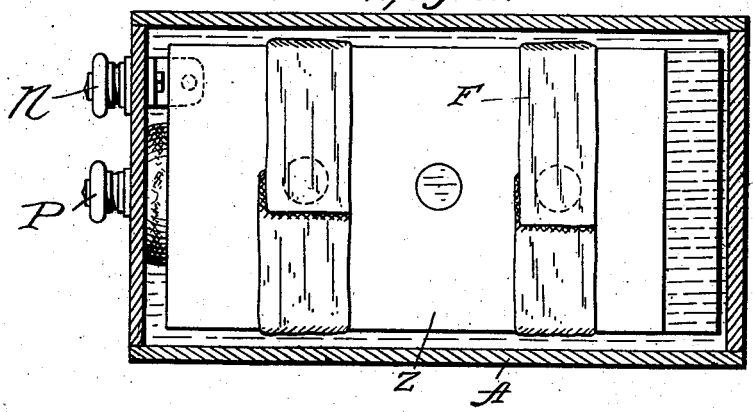
Figure 3:
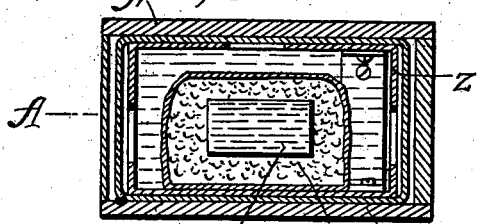
Figure 4:
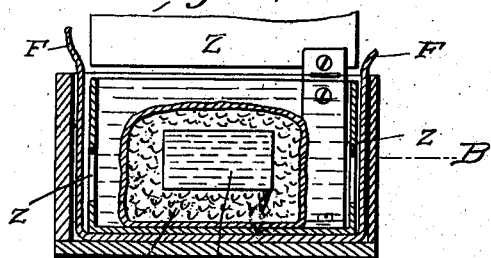

Figure 1 is a section of Figs. 3 and 4 on the line A B. Fig. 2 is a plan view, the perforations of the zinc being visible in the center, the insulating-felt being shown in two bands covering the perforations. Fig. 3 is a section of Fig. 1 on the line C D. Fig. 4 is a section same as Fig. 3, the lid being lifted and the zinc likewise to show the connections, the ends of the bands of felt being shown on both sides.

A represents the wooden box in which the battery is placed.

Z represents the zinc insulated from the casing, to all the sides and walls of which it corresponds except one side.

The contact wire or screw is represented at N.

L represents the carbon element, made of granular gas carbon mixed with an equal weight of the dioxid of manganese of as rich quality as possibile and inclosing a round plate of carbon provided with a contact-wire or connection P.

F represents bands of felt.

The carbon element and surrounding manganese dioxid are strongly bound up in a corded-canvas covering, and this is covered, preferably, with felt. The zinc is provided on the two large sides of the box or case with perforations of sufficient size to allow the paste to pass through, the paste being composed of sal-ammoniac, chlorid of zinc, and felt-dust, each of about one-third of the total quantity, to which is added some tenacious substance for the purpose of preserving the humidity of the battery. The substance for rendering immovable the liquid containing the active salts of the element consists of equal parts of felt-dust and turf in a coating of gelatin. This paste should fill up the casing entirely. Such a battery is admirably suited for telephones, telegraphs, motor vehicles and cycles, signals of any kind, brakes, and other purposes.

The form and dimensions of the battery may of course vary. In the paste the felt-dust may be replaced by other inert substance. In the carbon element the powdered gas carbon may be replaced by any other form of carbon. Instead of the paste composed as described in the above an adhesive material of any suitable description capable of producing an electric current in conjunction with the carbon and zinc elements may be simply placed within the casing, although the result will not be satisfactory. The felt may be replaced by similar material capable of preserving humidity.

Having now particularly described and ascertained the nature of the said invention and in what manner the same is to be performed, I declare that what I claim is—

A dry electric battery comprising a suitable casing, a carbon element therein comprising a carbon plate or rod with binoxid of manganese encircling the same and an inclosing wrapper retaining the same in position, an annular zinc element, having openings, and an electrolyte composed of chlorid of zinc and an inert material on both sides of said zinc element, substantially as described.

In witness whereof I have hereunto set my hand in presence of two witnesses.

PHILIPPE DELAFON.

Witnesses:
CHARLES DE MOSENTHAL,
EDWARD P. MACLEAN.